United States Patent
Yang et al.

(10) Patent No.: US 8,396,697 B2
(45) Date of Patent: Mar. 12, 2013

(54) ERROR COMPENSATION METHOD FOR MULTI-AXIS CONTROLLED MACHINES

(75) Inventors: Seung-Han Yang, Daegu (KR); Sung-Hwan Kweon, Daegu (KR); Dong-Mok Lee, Daegu (KR)

(73) Assignee: Kyungpook National University Industry Academic Cooperation Foundation (KR)

(*) Notice: Subject to any disclaimer, the term of this patent is extended or adjusted under 35 U.S.C. 154(b) by 232 days.

(21) Appl. No.: 12/947,495

(22) Filed: Nov. 16, 2010

(65) Prior Publication Data

US 2011/0224958 A1    Sep. 15, 2011

(30) Foreign Application Priority Data

Mar. 12, 2010   (KR) .................. 10-2010-0022445

(51) Int. Cl.
  *G06F 7/60* (2006.01)
  *G06F 17/10* (2006.01)
(52) U.S. Cl. .......................................................... 703/2
(58) Field of Classification Search ........ 703/2; 702/85, 702/95
  See application file for complete search history.

(56) References Cited

U.S. PATENT DOCUMENTS

2010/0299094 A1*  11/2010  Hsu .................................. 702/95

OTHER PUBLICATIONS

Soons et al. "Modeling the errors of multi-axis machines: a general methodology". 1992., 15 pages.*
Wang et al. "Automated Evaluation of Volumetric errors of Multi-axis machines.", 1994. p. 291-297.*

* cited by examiner

*Primary Examiner* — Eunhee Kim
(74) *Attorney, Agent, or Firm* — Levenfeld Pearlstein, LLC (57) ABSTRACT

An error compensation method for multi-axis controlled machines generates an error compensation model for compensating for geometric error of a multi-axis controlled machine by separating an error matrix of a tool tip from an error synthesis model of a multi-axis controlled machine and calculates an error compensation value using the error compensation model and an inverse kinematic model so that the error matrix becomes an identity matrix. The error compensation method can reduce calculation error and calculation time due to complicated numerical analysis and compensate for error in the multi-axis controlled machine, regardless of its configuration.

3 Claims, 7 Drawing Sheets

(a) $\Delta P_x$

(b) $\Delta P_y$ (c) $\Delta P_z$

FIG. 6

(a) $\Delta n_x$ (b) $\Delta n_y$ (c) $\Delta n_z$

FIG. 7

(a) BEFORE COMPENSATION (error value x 10)

(b) AFTER COMPENSATION (error value x 1000)

FIG. 8

ERROR COMPENSATION METHOD FOR MULTI-AXIS CONTROLLED MACHINES

CROSS REFERENCE TO RELATED APPLICATION

The present application claims priority from Korean Patent Application Number 10-2010-0022445 filed on Mar. 12, 2010, the entire contents of which application is incorporated herein for all purposes by this reference.

BACKGROUND OF THE INVENTION

1. Field of the Invention

The present invention relates to an error compensation method for multi-axis controlled machines, which can perform geometric error compensation in order to improve the machining precision of a multi-axis controlled machine, regardless of its configuration.

2. Description of Related Art

Multi-axis controlled machines are a type of mechanical apparatus that includes two or more drive axes. Examples of the multi-axis controlled machines may include a multi-axis machine tool, a multi-axis articulated robot, a Coordinate Measuring Machine (CMM), and the like.

Multi-axis controlled machines are intrinsically plagued by many kinds of geometric errors, such as the error of each drive axis and the error between drive axes, which are complicatedly interlinked to each other, thereby resulting in deviation of final result (i.e., position and orientation) when the multi-axis controlled machine is driven or shifted.

Therefore, it is necessary to compensate for such geometric error in order to improve the precision of multi-axis controlled machines.

In this light, when compensating for geometric error of a machine tool having three or fewer axes, all of which are linear axes, it is necessary only to directly produce a compensation value for each drive axis, since only position error must be compensated for.

However, it is difficult to compensate for the geometric error of multi-axis controlled machines since multi-axis controlled machines, in which control over a rotation axis and the like is also simultaneously performed, must be subjected to compensation for both position error and orientation error.

Therefore, there is a demand for a solution that is able to quickly produce a compensation value for each drive axis in all types of multi-axis controlled machines, each of which includes four drive axes or more.

An error compensation method using the Newton-Raphson method is a generally known error compensation method. This method will be described with reference to FIG. 1.

Figure 1:
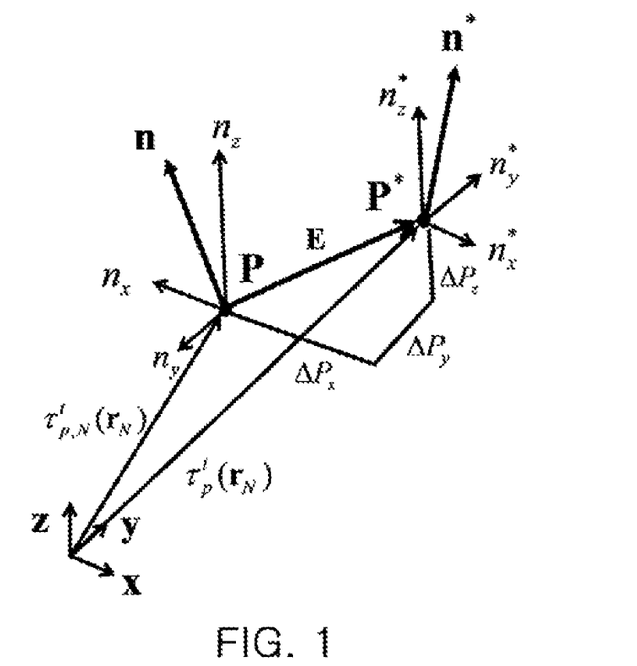
FIG. 1 is a diagram expressing geometric error occurring in a multi-axis controlled machine.

FIG. 1 is a diagram expressing geometric error that occurs between a tool tip and a workpiece due to geometric error in a five-axis controlled machine.

Referring to FIG. 1, in the five-axis controlled machine, the position and orientation of the tool tip with respect to a nominal value $r_N$ of a joint variable include position error and orientation error according to volumetric error $E_v(r_N)$ as expressed by Formula 1 below:

$$\tau_p^t(r_N) = \tau_{p,N}^t(r_N) + E_v(r_N) \quad \text{Formula 1}$$

In Formula 1 above, $r_N$, which is the nominal value of the joint variable, is $[x_N, y_N, z_N, b_N, c_N]$, $\tau_p^t$ is a homogeneous transformation matrix that includes error, $\tau_{p,N}^t$ is a homogeneous transformation matrix that does not include error, and $E_v(r_N)$ indicates volumetric error with respect to the nominal value $r_N$ of the joint variable.

It is possible to divide the volumetric error into position error and orientation error. In FIG. 1, $\Delta P_x = P^*_x - P_x$, $\Delta P_y = P^*_y - P_y$, and $\Delta P_z = P^*_z - P_z$ indicate the position error of the tool tip, and $\Delta n_x = n^*_x - n_x$, $\Delta n_y = n^*_y - n_y$, and $\Delta n_z = n^*_z - n_z$ indicate the orientation error of the tool tip.

In the above description, error compensation serves to produce a compensation value $r_C$ for each joint variable (x, y, z, b, c), so that the volumetric error becomes a zero matrix, that is, $E_v = 0$. It aims to find an input value $r_C$ of a transformation matrix $\tau_p^t(r_C)$ that includes error, so that the transformation matrix $\tau_p^t(r_C)$ has the same position and orientation as when the nominal value $r_N$ is input to a transformation matrix $\tau_{p,N}^t(r_N)$ that does not include error. The input value $r_C$ becomes a compensation value. This is expressed by Formula 2 below.

$$G(r_C) = \tau_{p,N}^t(r_N) - \tau_p^t(r_C) = 0 \quad \text{Formula 2}$$

In Formula 2 above, $r_C$, which is the compensation value of the joint variable, is $[x_C, y_C, z_C, b_C, c_C]$. In Formula 2 above, $\tau_{p,N}^t(r_N)$ can be produced by inputting a nominal value of a joint variable to a pure kinematic model, and $\tau_p^t(r_C)$ can be produced by inputting a compensation value of a joint variable to an error synthesis model. In addition, G is a 4×4 matrix, in which $G_{1,4}$, $G_{2,4}$, and $G_{3,4}$, which indicate position error, and $G_{1,3}$ and $G_{2,3}$, which are related to the orientation of the tool tip in the orientation error, are matrix components necessary for error compensation (hereinafter, referred to as error components). When the error components are combined in a formula that uses the compensation value $r_C$ as a variable, they are expressed by Formula 3 below.

$$F_1(r_C) = G_{1,4} = \Delta P_x = 0$$

$$F_2(r_C) = G_{2,4} = \Delta P_y = 0$$

$$F_3(r_C) = G_{3,4} = \Delta P_z = 0$$

$$F_4(r_C) = G_{1,3} = \Delta n_x = 0$$

$$F_5(r_C) = G_{2,3} = \Delta n_y = 0 \quad \text{Formula 3}$$

When Formula 3 is solved with respect to the variables $[x_C, y_C, z_C, b_C, c_C]$, with which it is intended to produce a simultaneous equation, the compensation value $r_C$ for error compensation can be produced. However, it is impossible to linearly solve Formula 3, since each equation includes nonlinear functions. For this purpose, the Newton-Raphson method, which is a numerical analysis method that can effectively produce a solution for a nonlinear equation, is used.

The compensation value to be produced is defined as $r_C = r_N + \delta r$, in which the nominal value $r_N$ can be produced using inverse kinematics, and the difference $\delta r$ between the compensation value and the nominal value can be produced by the Newton-Raphson method as follows.

When expanded by a Taylor's series, the function $F_1$ in Formula 3 is expressed as follows:

$$F_i(r_N + \delta_r) = F_i(r_N) + \sum_{j=1}^{5} \frac{\partial F_i}{\partial r_{N_j}} \delta_{r_{N_j}} + O(\delta r_N^2),$$

$$i = 1, 2, 3, 4, 5$$

In addition, when higher-order terms are omitted from the above formula, it is expressed by the following matrix.

$$F(r_N + \delta r) = F(r_N) + J \delta r$$

Here, if $F(r_N+\delta r)=F(r_C)=0$, it is possible to produce a linear equation for producing $\delta r$ as follows.

$$F(r_N)+J\delta r=0$$

In this equation, F is a vector that uses the function $F_1$ as a component, and J is a Jacobian matrix. It is possible to produce the linear equation by performing partial differentiation on the joint variable in each equation of Formula 3 above. If an inverse matrix $J^{-1}$ of J exists, $\delta r$ is produced as follows:

$$\delta r = -J^{-1}F(\cdot r_N)$$

If $\delta r$, produced as described above, is smaller than a preset tolerance, a compensation value for the joint variable is set as a final error compensation value.

That is, in the error compensation using the numerical analysis method, a Jacobian matrix J is formed by producing a partial differential value for each joint variable after a nominal value $r_N$ for tool posture is produced using inverse kinematics and an error compensation model F as in Formula 3 is formed, and $\delta r$ is calculated after a Jacobian inverse matrix is produced using the LU Decomposition or SVD. This process is repeated until $\delta r$ becomes smaller than the preset tolerance. If $\delta r$ is smaller than the preset tolerance, the compensation value $r_C$ of the joint variable is calculated by applying $\delta r$.

However, in the error compensation for multi-axis controlled machines, it is required to produce the differential values of geometric error components in order to form the Jacobian matrix J. Therefore, it is difficult to apply the error compensation method using the Newton-Raphson method, for general use, to an interpolator or a controller of a Numerical Control (NC) or, for practical use, to multi-axis controlled machines having a variety of configurations. In addition, numerical calculation, such as the LU Decomposition or SVD, is required to produce the inverse Jacobian matrix. Since there is possibility that the inverse Jacobian matrix may not exist due to limited numerical expression of a computer, it is required to jointly use an additional method in order to produce a solution.

The information disclosed in this Background of the Invention section is only for the enhancement of understanding of the background of the invention and should not be taken as an acknowledgment or any form of suggestion that this information forms a prior art that would already be known to a person skilled in the art.

BRIEF SUMMARY OF THE INVENTION

Various aspects of the present invention provide an error compensation method for multi-axis controlled machines, which can efficiently produce an error compensation value using an error synthesis model, an error matrix, and kinematics, and can compensate for error in real time by reducing calculation error and time.

In an aspect of the invention, the error compensation method for multi-axis controlled machines may include the steps of generating an error compensation model by separating an error matrix of a tool tip from an error synthesis model of a multi-axis controlled machine, whereby the error compensation model compensates for the geometric error of the multi-axis controlled machine, and calculating an error compensation value using the error compensation model and an inverse kinematic model so that the error matrix becomes an identity matrix.

According to an exemplary embodiment of the invention, the process of calculating an error compensation value can include the steps of calculating a nominal value for tool posture of a multi-axis controlled machine, which is subjected to error compensation, using inverse kinematics, forming an error synthesis model by inputting the nominal value as an initial value of the error compensation value to the error compensation model, calculating the error compensation value by calculating position and orientation of the tool tip from the error synthesis model and applying inverse kinematics, and repeating forming an error synthesis model by applying the calculated error compensation value if a difference between the calculated error compensation value and the nominal value is greater than a predetermined tolerance and determining the calculated error compensation value as a final error compensation value if the difference between the calculated error compensation value and the nominal value is not greater than the predetermined tolerance.

According to another exemplary embodiment of the invention, the error compensation model can be expressed by the following formula:

$$\tau^t_{p,N}(r_C) = \tau^t_{p,N}(r_N)[E^t_p(r_C)]^*,$$

wherein $\tau^t_{p,N}(r_C)$ is tool posture that does not include error of the error compensation value $r_C$, $\tau^t_{p,N}(r_N)$ is tool posture that does not include error of the nominal value $r_N$, and $[E^t_p(r_C)]^*$ is an inverse matrix of an error matrix of the error compensation value $r_C$ and is an approximate formula produced by omitting error terms from $[E^t_p(r_C)]^{-1}$.

According to further another exemplary embodiment of the invention, the inverse matrix of the error matrix is expressed by a following formula:

$$[E^t_p]^* = \begin{bmatrix} R^T & -R^T P \\ 0 & 1 \end{bmatrix},$$

wherein $R^T$ indicates a transposed matrix of a rotation error matrix R, and P is a position error vector.

According to exemplary embodiments of the present invention as set forth above, the error compensation method can reduce calculation error and calculation time due to complicated numerical analysis by producing an error matrix using an error synthesis model and producing a compensation value of each joint variable using an inverse matrix of the error matrix, pure kinematics, and inverse kinematics, the compensation value making it possible to reduce geometric error of a multi-axis controlled machine. Thereby, the compensation method is easily applicable to an NC controller and can compensate for errors in real time. Furthermore, the compensation method has an excellent effect of being able to compensate for error in a multi-axis controlled machine, regardless of its configuration.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments that may be included within the spirit and scope of the invention as defined by the appended claims.

In the following description of the present invention, detailed descriptions of known functions and components incorporated herein will be omitted when they may make the subject matter of the present invention unclear. In addition, throughout this document, reference should be made to the drawings, in which the same reference numerals and signs are used throughout the different drawings to designate the same or similar components.

An error compensation method for multi-axis controlled machines according to an exemplary embodiment of the invention includes the processes expressed by Formula 4 below. Specifically, the error compensation method includes the process of generating an error compensation model, which is used to compensate for error in a multi-axis controlled machine, by separating an error matrix $E_p^t$ of a tool tip from an error synthesis model of the multi-axis controlled machine, and the process of producing an error compensation value $r_C$ using the error compensation model so that the error matrix $E_p^t$ becomes an identity matrix I.

$$\tau_p^t(r_N) = \tau_{p,N}^t(r_N) E_p^t(r_N) \quad \text{Formula 4}$$

The error matrix $E_p^t$ can be expressed by Formula 5 below.

$$E_p^t = \begin{bmatrix} 1 & -\lambda_z & \lambda_y & \mu_x \\ \lambda_z & 1 & -\lambda_x & \mu_y \\ -\lambda_y & \lambda_x & 1 & \mu_z \\ 0 & 0 & 0 & 1 \end{bmatrix} = \begin{bmatrix} R & P \\ 0 & 1 \end{bmatrix} \quad \text{Formula 5}$$

In Formula 5 above, R is a rotation error matrix, and P is a position error vector, which are expressed as follows:

$$R = \begin{bmatrix} 1 & -\lambda_z & \lambda_y \\ \lambda_z & 1 & -\lambda_x \\ -\lambda_y & \lambda_x & 1 \end{bmatrix}$$

$$P = \begin{bmatrix} \mu_x \\ \mu_y \\ \mu_z \end{bmatrix}$$

In addition, each error component constituting the error matrix is expressed by Formula 6 below.

$$\mu_x = (\delta_{xb} - \delta_{xc} - \delta_{xx} - \delta_{xy} + \delta_{xz} - \delta_2 \varepsilon_{yc} + d_1 \varepsilon_{zb}) \cos b + \quad \text{Formula 6}$$
$$(-\varepsilon_{yc} - \varepsilon_{yx} - \varepsilon_{yy}) z \cos b +$$
$$(-\delta_{zb} + \delta_{zc} + \delta_{zx} + \delta_{zy} - \delta_{zz} + d_1 \varepsilon_{xb}) \sin b +$$
$$(\varepsilon_{yc} + \varepsilon_{yx} - s_{yx}) x \sin b +$$
$$y((-\varepsilon_{zc} - \varepsilon_{zx} - \varepsilon_{zy}) \cos b + (-\varepsilon_{xc} - \varepsilon_{xx} - \varepsilon_{xy} + s_{xy}) \sin b)$$
$$\mu_y = \delta_{yb} - \delta_{yc} - \delta_{yx} - \delta_{yy} + \delta_{yz} + d_2 \varepsilon_{xc} +$$
$$(\varepsilon_{zc} + \varepsilon_{zx} - s_{zx}) x + (\varepsilon_{xc} + \varepsilon_{xx} + \varepsilon_{xy}) z$$
$$\mu_z = (\delta_{zb} - \delta_{zc} - \delta_{zx} - \delta_{zy} + \delta_{zz} - d_1 \varepsilon_{xb}) \cos b +$$
$$(-\varepsilon_{yc} - \varepsilon_{yx} - s_{yx}) x \cos b +$$
$$(\delta_{xb} - \delta_{xc} - \delta_{xx} - \delta_{xy} + \delta_{xz} - d_2 \varepsilon_{yc} + d_1 \varepsilon_{zb}) \sin b +$$
$$(-\varepsilon_{yc} - \varepsilon_{yx} - \varepsilon_{yy}) z \sin b +$$
$$y((\varepsilon_{xc} + \varepsilon_{xx} + \varepsilon_{xy} - s_{xy}) \cos b + (-\varepsilon_{zc} - \varepsilon_{zx} - \varepsilon_{zy}) \sin b)$$
$$\lambda_x = (\varepsilon_{xb} - \varepsilon_{xc} - \varepsilon_{xx} - \varepsilon_{xy} + \varepsilon_{xz}) \cos b +$$
$$(-\varepsilon_{zb} + \varepsilon_{zc} + \varepsilon_{zx} + \varepsilon_{zy} - \varepsilon_{zz}) \sin b$$
$$\lambda_y = \varepsilon_{yb} - \varepsilon_{yc} - \varepsilon_{yx} - \varepsilon_{yy} + \varepsilon_{yz}$$
$$\lambda_z = (\varepsilon_{zb} - \varepsilon_{zc} - \varepsilon_{zx} - \varepsilon_{zy} + \varepsilon_{zz}) \cos b +$$
$$(\varepsilon_{xb} - \varepsilon_{xc} - \varepsilon_{xx} - \varepsilon_{xy} + \varepsilon_{xz}) \sin b$$

Figure 2:
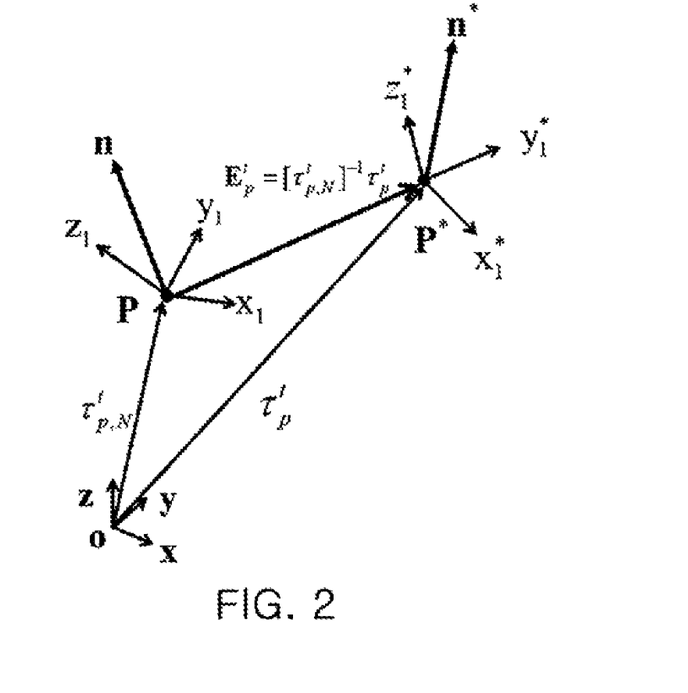
FIG. 2 is a diagram showing an error compensation concept for multi-axis controlled machines according to an exemplary embodiment of the invention.

FIG. 2 is a diagram showing an error compensation concept for multi-axis controlled machines according to an exemplary embodiment of the invention.

Referring to FIG. 2, in a multi-axis controlled machine, position P and orientation n for a nominal value $r_N$ of a joint variable are shifted to position P* and orientation n* due to geometric error. When expressed in a coordinate transformation matrix, this is expressed by Formula 7 below.

$$E_p^t(r_N) = [\tau_{p,N}^t(r_N)]^{-1} \tau_p^t(r_N) \quad \text{Formula 7}$$

In Formula 7 above, an error matrix can be produced from an error synthesis model and a kinematic model of the multi-axis controlled machine, as described above.

In addition, as in the foregoing error compensation using numerical analysis, tool posture that includes the error of the error compensation value $r_C$ should be the same as tool posture that does not include the error of the nominal value $r_N$ for error compensation. Thus, the tool posture is expressed by Formula 8 below.

$$\tau_{p,N}^t(r_N) = \tau_p^t(r_C) \quad \text{Formula 8}$$

Referring to Formula 4 above, tool posture $\tau_p^t(r_C)$, which includes the error of the error compensation value $r_C$, is a multiplication of tool posture $\tau^t_{p,N}(r_C)$, which does not include the error of the compensation value $r_C$, and an error matrix $E^t_p(r_C)$, as expressed by Formula 9 below.

$$\tau^t_p(r_C) = \tau_{p,N}{}^t(r_C) E_p{}^t(r_C) \quad \text{Formula 9}$$

When Formulas 8 and 9 are rearranged by setting the tool posture $\tau^t_{p,N}(r_C)$, which does not include the error of the error compensation value $r_C$, to the left side, the tool posture can be expressed by a multiplication of a posture $\tau^t_{p,N}(r_N)$ of the tool tip with respect to the nominal value $r_N$ of the joint variable and an inverse matrix $[E^t_p(r_C)]^{-1}$ of an error matrix with respect to the compensation value, as in Formula 10 below.

$$\tau_{p,N}{}^t(r_C) = \tau_{p,N}{}^t(r_N) [E_p{}^t(r_C)]^{-1} \quad \text{Formula 10}$$

The nominal value $r_N$ of the joint variable is substituted as an initial value of the compensation value $r_C$, which is intended to be produced in the inverse matrix $[E^t_p(r_C)]^{-1}$ of Formula 10 above, and the error compensation value is calculated using inverse kinematics. The difference $\delta r$ between the compensation value and the nominal value can be produced as in Formula 11 below, and a final error compensation value $r_C$ can be produced by repeatedly iterating Formula 10 above until $\delta r$ becomes smaller than a given tolerance.

$$\Delta r = r_C - r_N \quad \text{Formula 11}$$

However, in order to compensate for error in real time, an analytic solution should be produced, instead of a numerical solution from the inverse matrix $[E^t_p(r_C)]^{-1}$ of an error matrix.

In relation to this, the rotation error matrix R in Formula 5 is expressed by Formula 12 below.

$$R = \begin{bmatrix} 1 & -\lambda_z & \lambda_y \\ \lambda_z & 1 & -\lambda_x \\ -\lambda_y & \lambda_x & 1 \end{bmatrix} = \begin{bmatrix} 1 & 0 & 0 \\ 0 & 1 & 0 \\ 0 & 0 & 1 \end{bmatrix} - \begin{bmatrix} 0 & \lambda_z & -\lambda_y \\ -\lambda_z & 0 & \lambda_x \\ \lambda_y & -\lambda_x & 0 \end{bmatrix} = I - A \quad \text{Formula 12}$$

In Formula 12 above, I indicates an identity matrix, and A indicates a skew-symmetric matrix.

The inverse matrix of I−A can be expressed by the sum of the identity matrix and a series of the matrix A, as in Formula 13 below.

$$(I - A)^{-1} = I + A + A^2 + \ldots \sum_{k=0}^{8} A^k \quad \text{Formula 13}$$

When higher-order terms are omitted from the inverse matrix I−A presented in Formula 13 above, it is approximated as the first term of (I+A). This is the same as the transposed matrix $R^T$ of the matrix R, and the inverse matrix of the rotation error matrix R is presented as $R^T$. Therefore, the inverse matrix $[E^t_p]^{-1}$ of the error matrix can be expressed by Formula 14 below.

$$[E^t_p]^{-1} = \begin{bmatrix} R^T & -R^T P \\ 0 & 1 \end{bmatrix} = \begin{bmatrix} 1 & \lambda_z & -\lambda_y & -\mu_x - \lambda_z \mu_y + \lambda_y \mu_z \\ -\lambda_z & 1 & \lambda_x & -\mu_y + \lambda_z \mu_x - \lambda_x \mu_z \\ \lambda_y & -\lambda_x & 1 & \mu_z + \lambda_x \mu_y - \lambda_y \mu_x \\ 0 & 0 & 0 & 1 \end{bmatrix} \quad \text{Formula 14}$$

In the matrix of Formula 14 above, the multiplication of an error term can be omitted since it is very small. Therefore, it is possible to present the inverse matrix of the error matrix as an approximate formula $[E^t_p]^*$ by omitting the multiplication of the error terms from Formula 14 above. The approximate formula $[E^t_p]^*$ is expressed by Formula 15 below.

$$[E^t_p]^* = \begin{bmatrix} R^T & -R^T P \\ 0 & 1 \end{bmatrix} = \begin{bmatrix} 1 & \lambda_z & -\lambda_y & -\mu_x \\ -\lambda_z & 1 & \lambda_x & -\mu_y \\ \lambda_y & -\lambda_x & 1 & -\mu_z \\ 0 & 0 & 0 & 1 \end{bmatrix} \quad \text{Formula 15}$$

Therefore, the error compensation model of Formula 10 is defined by Formula 16 below.

$$\tau_{p,N}{}^t(r_C) = \tau_{p,N}{}^t(r_N) [E_p{}^t(r_C)]^* \quad \text{Formula 16}$$

Since the individual components of the approximate formula $[E^t_p]^*$ can be produced merely by changing the signs of error components $(\mu_x, \mu_y, \mu_z, \lambda_x, \lambda_y, \lambda_z)$ of Formula 5 above, it is possible to calculate a compensation value of a joint variable in real time. In addition, it is not necessary to calculate an inverse matrix using differentiation and numerical analysis on the joint variable. In addition, since the error matrix of the tool tip is used alone, separately from the error synthesis model, it is easy apply the error matrix to NC. In addition, it is possible to reduce the amount of time spent calculating numerical formulas.

Figure 3:
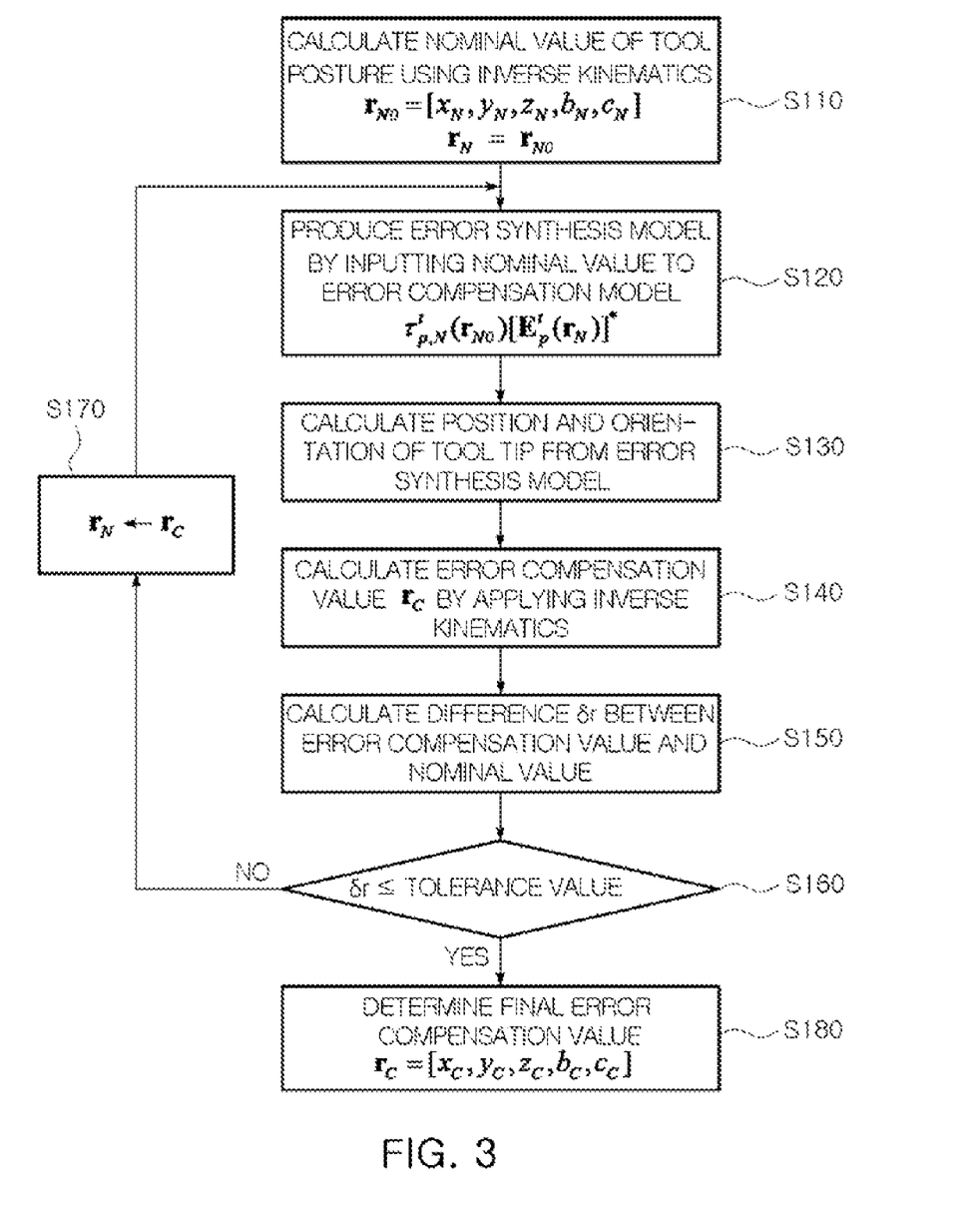
FIG. 3 is a flowchart showing a detailed process of producing an error compensation value using an error compensation model in the error compensation method for multi-axis controlled machines according to an exemplary embodiment of the invention.

FIG. 3 is a flowchart showing the error compensation method for multi-axis controlled machines according to an exemplary embodiment of the invention. Below, with reference to FIG. 3, the error compensation method for multi-axis controlled machines according to an exemplary embodiment of the invention will be described according to the processing sequence.

First, in S110, a nominal value $r_N$ of a joint variable for the tool posture of a multi-axis controlled machine, which is subjected to error compensation, is calculated.

In S120, an error synthesis model is produced by inputting the nominal value $r_N$ of the joint variable to an error compensation model of Formula 16. In the error synthesis model produced as above, the nominal value $r_N$ is used as an initial value of a compensation value $r_C$.

The position and orientation of a tool tip are calculated from the synthesis model produced as above in S130, and the compensation value $r_C$ of the joint variable is calculated by applying inverse kinematics in S140.

In addition, the difference $\delta r$ between the calculated compensation value $r_C$ of the joint variable and the nominal value $r_N$ of the joint variable, calculated in the step S110, is calculated in S150.

The difference $\delta r$ is compared with a preset tolerance in S160. If $\delta r$ is greater than the tolerance, the compensation value $r_C$ calculated in the step S140 is input to $r_N$ and the process returns to the step S120 to repeat the calculation in S170.

If $\delta r$ is smaller than the tolerance, the compensation value $r_C$, calculated in the step S140, is determined as a final compensation value of the joint variable in S180

FIGS. 4 to 8 show the results of simulation of the error compensation method for multi-axis controlled machines according to an exemplary embodiment of the invention.

Figure 4:
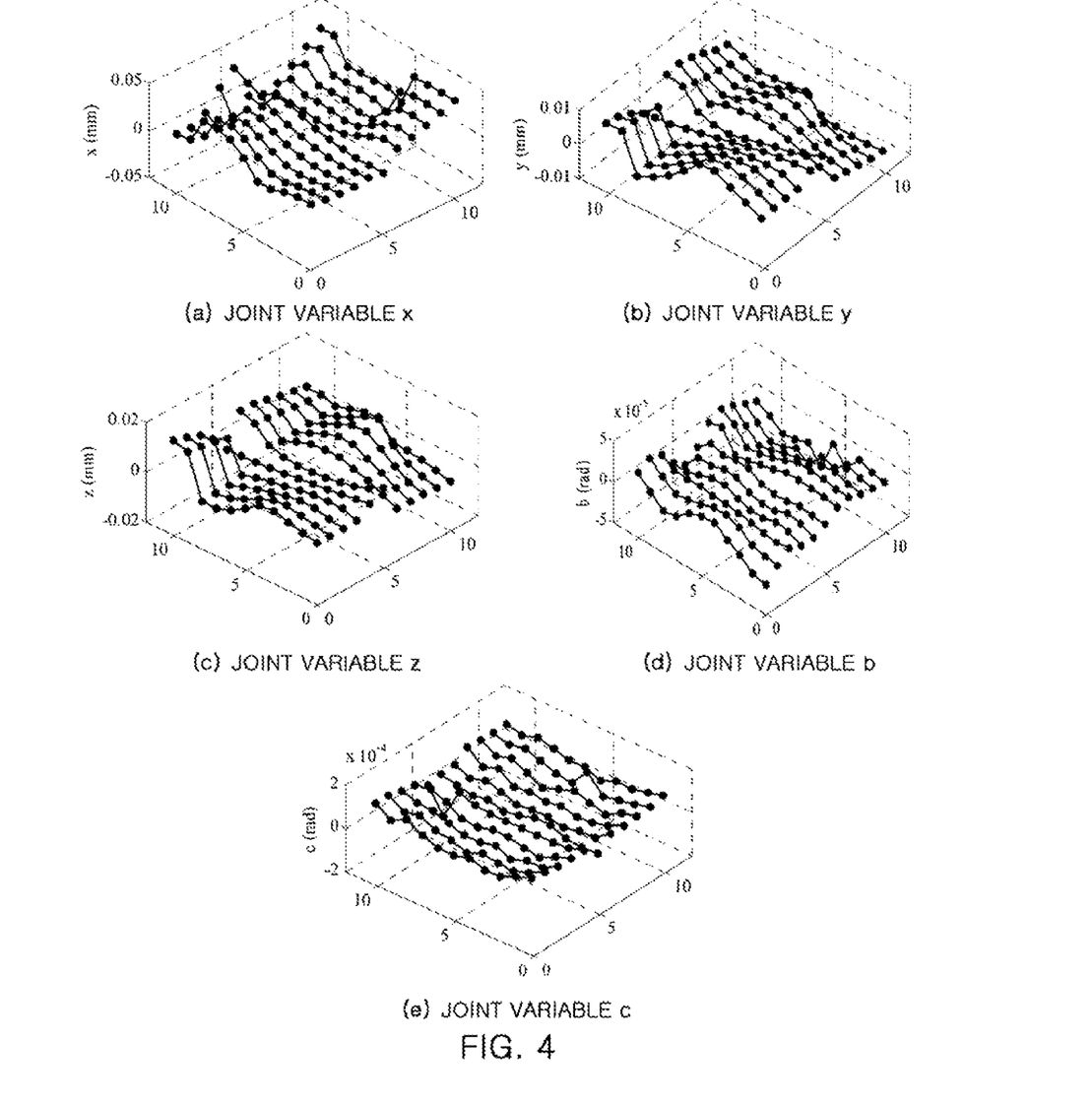
FIG. 4 is a graph showing the amount of error compensation as the result of simulation of the error compensation method for multi-axis controlled machines according to an exemplary embodiment of the invention.
Figure 5:
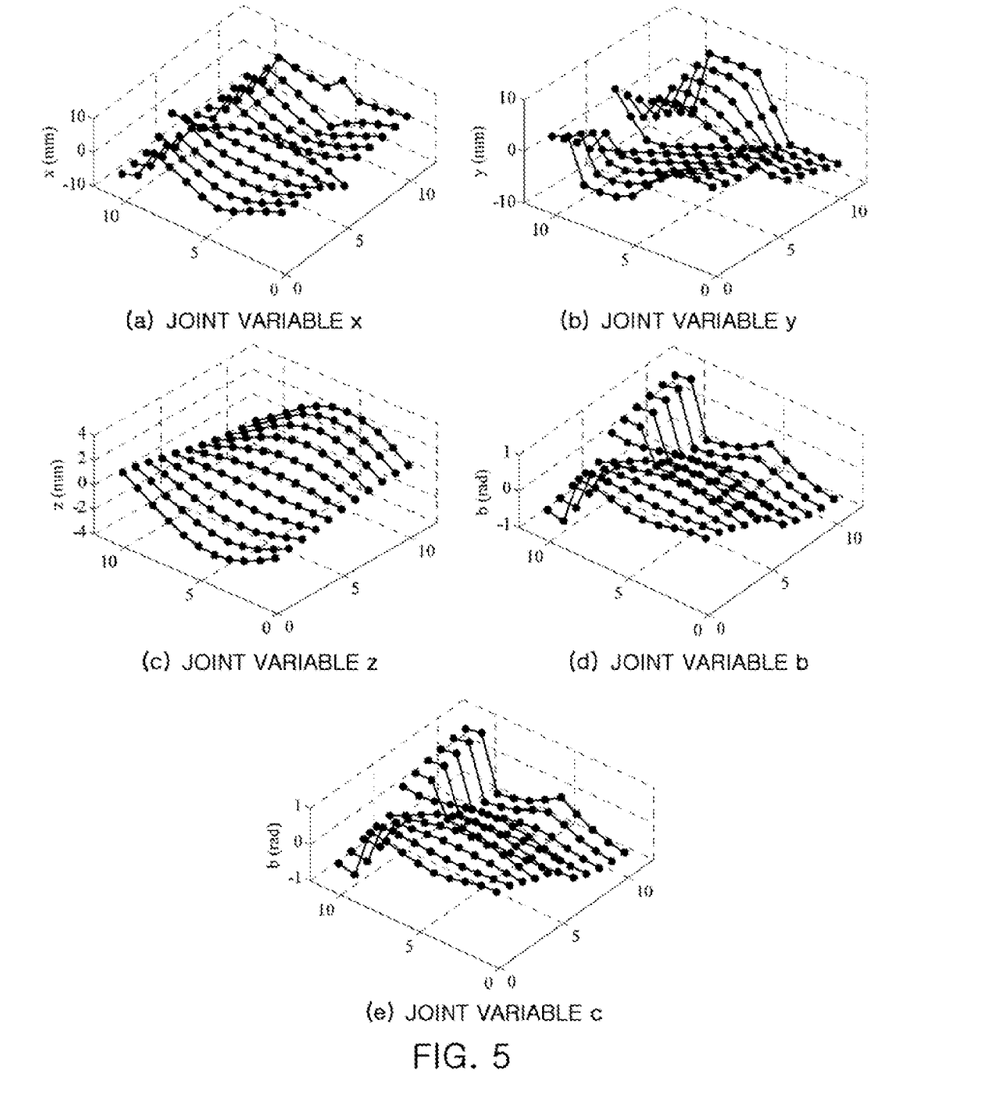
FIG. 5 is a graph showing a compensated joint variable as the result of simulation of the error compensation method for multi-axis controlled machines according to an exemplary embodiment of the invention.
Figure 6:
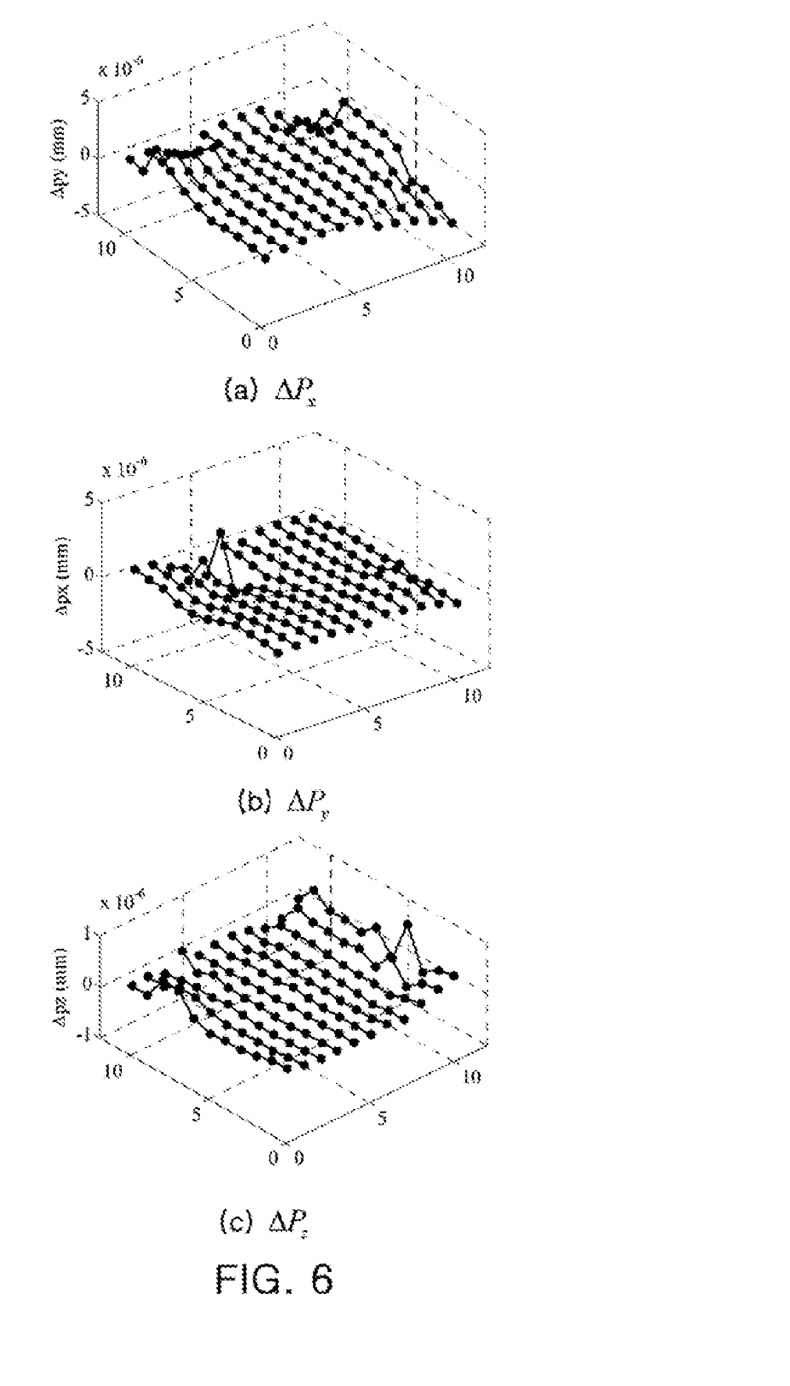
FIG. 6 is a graph showing position error after error compensation as the result of simulation of the error compensation method for multi-axis controlled machines according to an exemplary embodiment of the invention.
Figure 7:
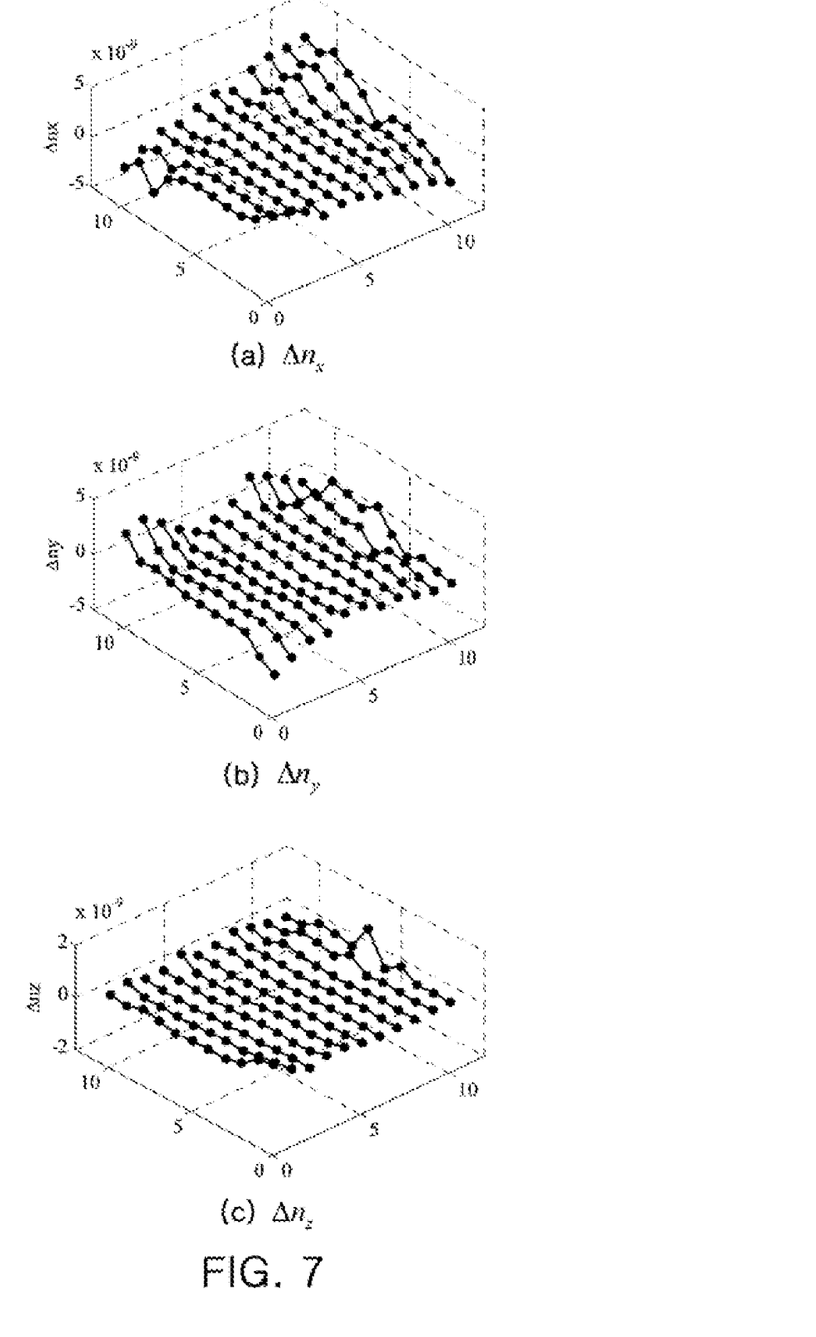
FIG. 7 is a graph showing orientation error after error compensation as the result of simulation of the error compensation method for multi-axis controlled machines according to an exemplary embodiment of the invention.

First, FIG. 4 shows the amount of error compensation of the joint variable, produced by the error compensation method according to an exemplary embodiment of the invention, and FIG. 5 shows the value of error compensation of the joint variable, produced by the error compensation method according to an exemplary embodiment of the invention. In addition, FIGS. 6 and 7 show position error and orientation error after compensation by the error compensation method according to an exemplary embodiment of the invention.

Referring to the diagrams, in the error compensation method according to an exemplary embodiment of the invention, $\Delta P_x=2.0\times10^{-6}$ [mm], $\Delta P_y=3.2\times10^{-6}$ [mm], and $\Delta P_z=0.8\times10^{-6}$ [mm] are maximum position errors that occur on free curved surfaces after compensation, and $\Delta n_x=3.4\times10^{-9}$ [rad], $\Delta n_y=2.6\times10^{-9}$ [rad], and $\Delta n_z=1.2\times10^{-9}$ [rad] are maximum orientation errors that occur on free curved surfaces after compensation. These are the results obtained by setting a tolerance used in error compensation as the resolution of a joint (e.g., $10^{-4}$ [m] for a linear joint, and $20\times10^{-6}$ [rad] for a rotary joint). It can be understood that error compensation is sufficient since the tolerance is sufficiently smaller than a controllable value of the joint. In a precise system, it is possible to further reduce error since the tolerance, which is to be compared, becomes smaller.

Figure 8:
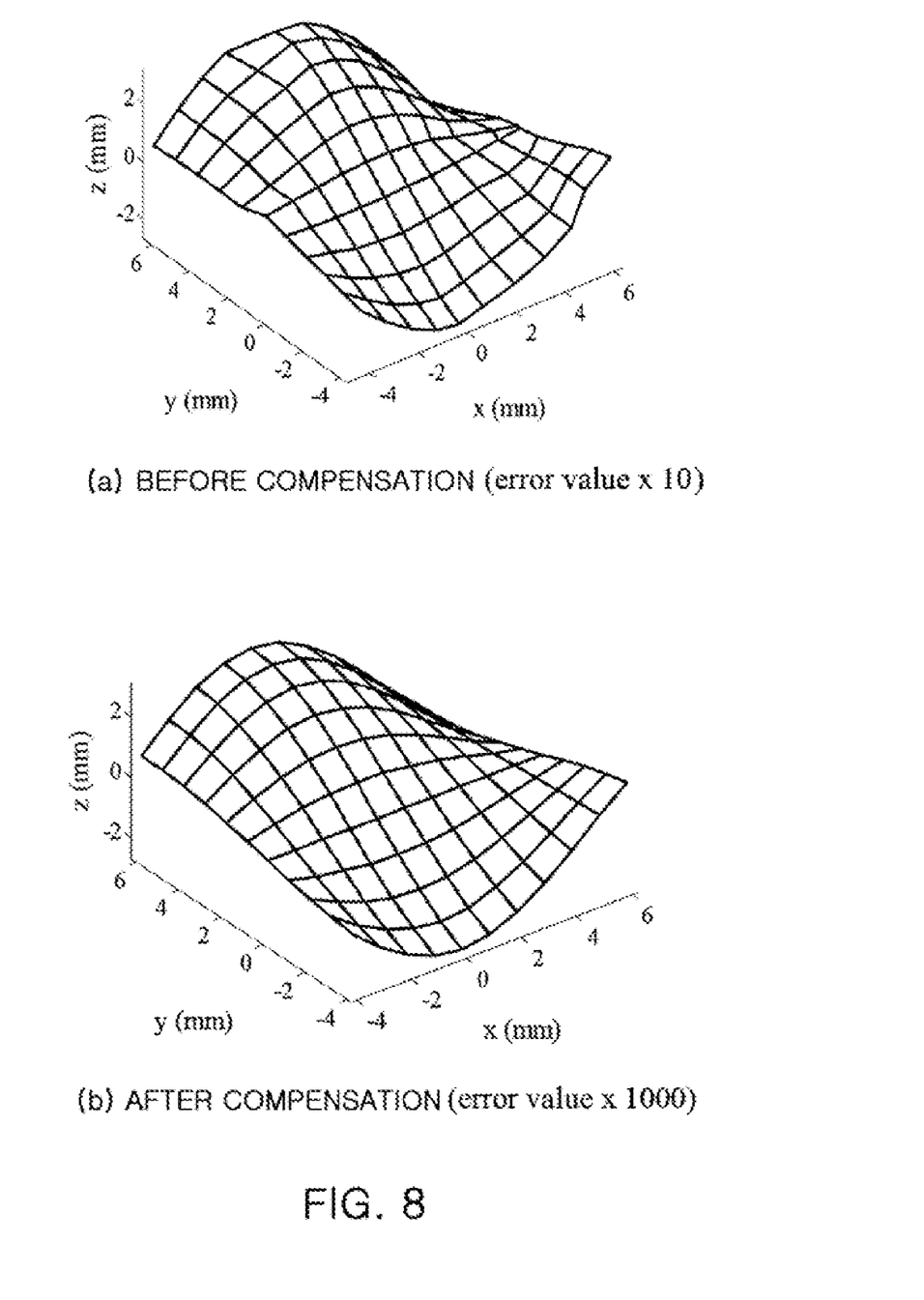
FIG. 8 is a graph comparing free surface configurations before and after compensation using the error compensation method for multi-axis controlled machines according to an exemplary embodiment of the invention.

FIG. 8 shows the effect of error on free curved surfaces before and after compensation by the error compensation method according to an exemplary embodiment of the invention. In FIG. 8, part (a) shows a free surface configuration before error compensation, and part (b) shows a free surface configuration after error compensation.

Referring to FIG. 8, it can be understood that the free surface configuration after error compensation is more similar to a designed configuration than the free surface configuration before error compensation is.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents. Although specific terms have been used in the description and the drawings, they have been used in a generic sense only to better describe the technical features of the invention and help understanding of the invention, but not for the purpose of limitation.

What is claimed is:

1. An error compensation method for multi-axis controlled machines comprising:

generating an error compensation model by separating an error matrix of a tool tip from an error synthesis model of a multi-axis controlled machine, whereby the error compensation model compensates for geometric error of the multi-axis controlled machine; and calculating an error compensation value using the error compensation model and an inverse kinematic model so that the error matrix becomes an identity matrix;

wherein the error compensation model is expressed by a following formula:

$$\tau_{p,N}^t(r_C) = \tau_{p,N}^t(r_N)[E_p^t(r_C)]^*,$$

wherein $r_C$ is the error compensation value, $\tau_{p,N}^t(r_C)$ is tool posture which does not include an error of the $r_C$, $r_N$ is a nominal value, $\tau_{p,N}^t(r_N)$ is tool posture which does not include an error of the $r_N$, and $[E_p^t(r_C)]^*$ is an inverse matrix of an error matrix of the error compensation value $r_C$ and is an approximate formula produced by omitting error terms from $[E_p^t(r_C)]^{-1}$.

2. The error compensation method according to claim 1, wherein calculating an error compensation value comprises:

calculating a nominal value for tool posture of a multi-axis controlled machine, which is subjected to error compensation, using inverse kinematics;

forming an error synthesis model by inputting the nominal value as an initial value of the error compensation value to the error compensation model;

calculating the error compensation value by calculating position and orientation of the tool tip from the error synthesis model and applying inverse kinematics; and repeating forming an error synthesis model by applying the calculated error compensation value if a difference between the calculated error compensation value and the nominal value is greater than a predetermined tolerance, and determining the calculated error compensation value as a final error compensation value if the difference between the calculated error compensation value and the nominal value is not greater than the predetermined tolerance.

3. The error compensation method according to claim 1, wherein the inverse matrix of the error matrix is expressed by a following formula:

$$[E_p^t]^* = \begin{bmatrix} R^T & -R^T P \\ 0 & 1 \end{bmatrix},$$

wherein $R^T$ indicates a transposed matrix of a rotation error matrix R, and P is a position error vector.

* * * * *

UNITED STATES PATENT AND TRADEMARK OFFICE
CERTIFICATE OF CORRECTION

PATENT NO. : 8,396,697 B2
APPLICATION NO. : 12/947495
DATED : March 12, 2013
INVENTOR(S) : Seung-Han Yang, Sung-Hwan Kweon and Dong-Mok Lee It is certified that error appears in the above-identified patent and that said Letters Patent is hereby corrected as shown below:

In the Claims:

In column 10, line 9 of the Letters Patent document, the formula is cited as $$\tau_{p,N}{}'(r_c) = \tau_{p,N}{}'(r_N)[E_p{}'(r_c)]^*$$ the formula should be cited as $$\tau_{p,N}^{i}(r_c) = \tau_{p,N}^{i}(r_N)[E_p^{i}(r_c)]^*$$

Signed and Sealed this
Twenty-third Day of July, 2013

Teresa Stanek Rea
*Acting Director of the United States Patent and Trademark Office*